United States Patent [19]

Iwasaki et al.

[11] Patent Number: 4,822,201

[45] Date of Patent: Apr. 18, 1989

[54] COUPLING PIN FOR SUCKER ROD MADE OF FIBER-REINFORCED PLASTIC MATERIAL

[75] Inventors: Toshio Iwasaki; Akihiko Katoh; Atsuhiko Murao; Masakazu Tsukada; Takashi Nakano; Masaru Nasu, all of Tokyo, Japan

[73] Assignee: Nippon Kokan Kabushiki Kaisha, Tokyo, Japan

[21] Appl. No.: 62,765

[22] Filed: Jun. 15, 1987

[30] Foreign Application Priority Data

Jul. 4, 1986 [JP] Japan ............................ 61-156215

[51] Int. Cl.⁴ ........................................... F16B 11/00
[52] U.S. Cl. ..................................... 403/268; 403/334
[58] Field of Search ................ 403/266, 267, 268, 334

[56] References Cited

U.S. PATENT DOCUMENTS 4,475,839 10/1984 Strandberg .................... 403/268 X
4,653,953 3/1987 Anderson et al. ................. 403/268
4,662,774 5/1987 Morrow, Jr. ...................... 403/266

Primary Examiner—Andrew V. Kundrat
Attorney, Agent, or Firm—Frishauf, Holtz, Goodman & Woodward

[57] ABSTRACT

A sucker rod coupling pin comprises a hole into which the sucker rod is to be inserted, and has a plurality of annular depressions which surround the inner wall of the hole. As viewed crosswise, the annular depressions respectively have tapered surface portions arranged in series from the open end to the closed end of the coupling pin hole. The tapered surface portions whose cross sections progressively increase toward the closed end of the coupling pin hole have their respective lengths progressively shortened in relation to the preceding tapered portion, toward the closed end of the coupling pin hole, and the angle of inclination of the respective tapered surface portions progressively increases toward the closed end of the coupling pin hole.

14 Claims, 4 Drawing Sheets

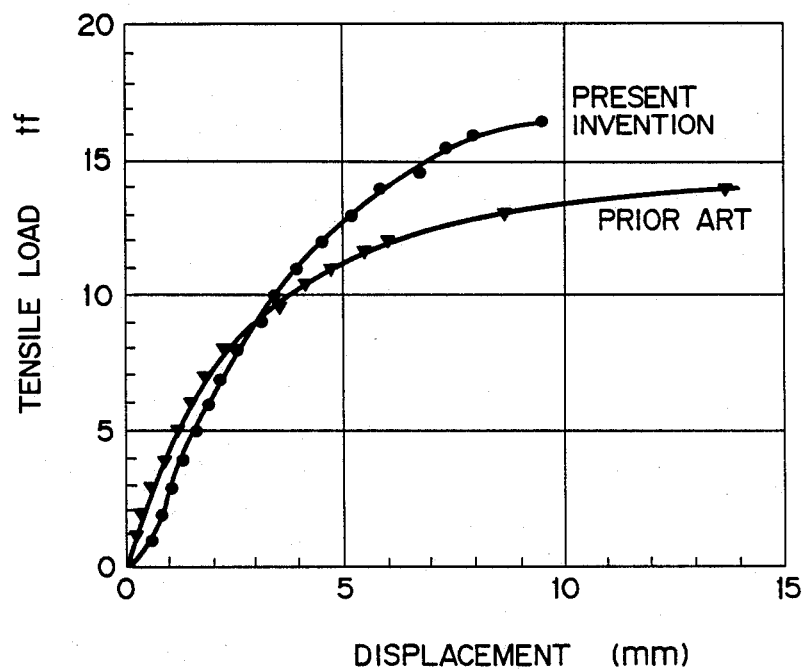
F I G. 3

COUPLING PIN FOR SUCKER ROD MADE OF FIBER-REINFORCED PLASTIC MATERIAL

BACKGROUND OF THE INVENTION

This invention relates to a sucker rod coupling pin prepared from fiber-reinforced plastics material.

Until now, any device used in the drilling of an oil well has been fabricated exclusively from steel. This practice is accompanied with the drawback that steel is a heavy material and is, moreover, very susceptible to corrosion. In recent times, the quality of fiber-reinforced plastics material has greatly improved. This material is lightweight and is highly corrosion-proof, and thus has come to be more widely used for manufacturing parts of oil well-drilling equipment.

When a deep oil well is drilled, the parts are used in the form of a number of connected units. A coupling type sucker rod is usually fabricated by fitting a metal pin to the rod end. The pins are joined together by a threaded coupling.

However, the threaded coupling has, in the past, presented difficulties with regard to mechanical strength when used to effect the connection of metal pins to the sucker rod. Consequently, various devices have been proposed to resolve these difficulties. One of the proposed processes, which consists of threading the outer wall of the rod itself, tends to cut up reinforcing fiber, resulting in an unacceptable decline in the mechanical strength of the coupling. At present, therefore, a friction type coupling dispensing with threading is being developed.

In this connection, metal coupling pin 1 will now be described with reference to FIG. 4. This coupling pin 1 comprises a coupling member 2 which is provided with elongated hole 4 into which sucker rod 10 is inserted. Threaded section 3 is formed on the peripheral portion of coupling member 2 at the closed end of coupling member 2 to be engaged with external coupling means (not shown). Until now, a metal coupling pin 2 has been employed. Three annular grooves are so formed as to surround the inner wall of coupling member 2. As viewed crosswise, the three annular grooves each have two tapered surface portions. Tapered surface portions 7, lying nearer to the closed end of hole 4, have a sharply rising plane, toward the open end of hold 4. Tapered surface portions 6, positioned remote from the closed end of hole 4, have a plane inclining gradually downward toward the open end of hole 4. Upward and downward inclining surfaces 7 and 6 are alternately arranged three times. Annular surface portion 5, surrounding the inner periphery of the open end of hole 4, has a long flat plane and is spaced from the outer surface of rod 10.

Resin 30 is placed in elongated hole 4, and rod 10 is forced thereinto. The resin is then allowed to harden, tightly gripping rod 10. A rod-pulling force is transmitted by means of the above-mentioned tapered depressions defined by surfaces 6, 7, with the aid of friction between the resin and the surfaces 6, 7.

The outer diameter of coupling member 2 progressively decreases toward the open end of elongated hole 4, thereby preventing an excessive force from being applied to sucker rod 10 if it happens to become warped. However, the proposed coupling pin 1 of FIG. 4 has the drawbacks in that since the length l of the tapered surfaces 6 and taper angle α thereof have the same value, contact pressure between coupling pin 1 and rod 10 varies more noticeably in the axial direction. When, therefore, sucker rod 10 is drawn out of elongated hole 4, a strong frictional force is generated at the second taper section as counted back from the open end of elongated hole 4, frequently causing sucker rod 10 to break at said second taper section.

The present invention has been developed in view of the above-mentioned circumstances, and is intended to provide a sucker rod coupling pin the design of which resolves the aforementioned difficulties.

SUMMARY OF THE INVENTION

To attain the above-mentioned object, this invention provides a sucker rod coupling pin, wherein a plurality of annular tapered depressions are formed around the inner wall of an elongated blind hole into which a sucker rod is to be inserted, and the angle of inclination of the respective annular depressions grows progressively greater toward the closed end of the elongated blind hole, while, at the same time, the length of these depressions becomes successively shorter.

Thus, a sucker rod coupling pin embodying the present invention offers the advantages in that a uniform frictional pressure is generated between the coupling pin and the sucker rod provided with a hardened resin layer, and a uniform axially directed stress can be applied to the sucker rod and resin layer.

BRIEF DESCRIPTION OF THE DRAWINGS

FIG. 3 diagramatically indicates the results of a tensile test, namely, the displacement and load is compared with the results obtained with respect to the prior art sucker rod coupling pin.

DESCRIPTION OF THE EMBODIMENT

Figure 1:
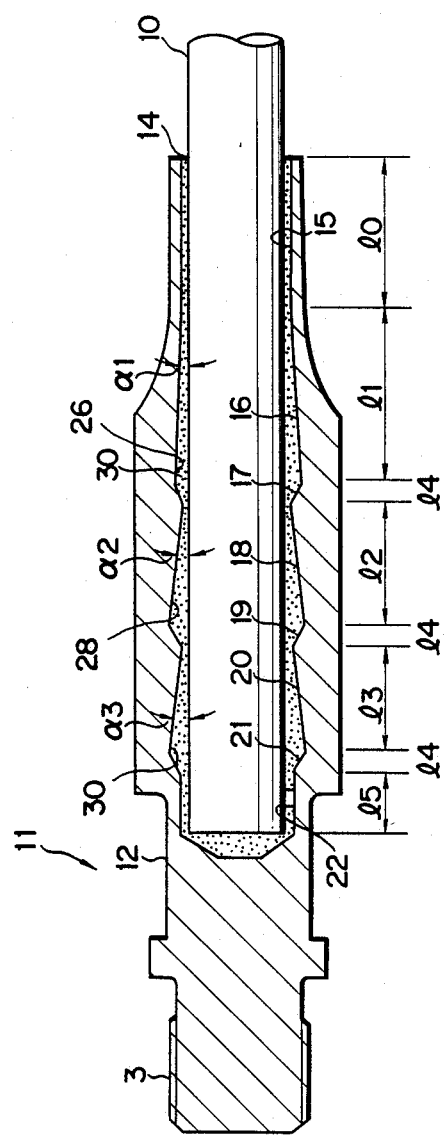
FIG. 1 is a longitudinal sectional view of a coupling pin embodying the present invention, into which a sucker rod is inserted.

A sucker rod coupling pin prepared from fiber-reinforced plastics material will now be described, with reference to FIG. 1. The inner wall of hole 14 of coupling pin 12 embodying the present invention, into which sucker rod 10 is to be inserted, comprises a plurality of annular depressions 26, 28, 30. Outermost annular inner wall portion 15 of hole 14 has a flat cross section. The first tapered cross section section surface portion 16 of the first annular depression 26 adjacent surface portion 15 progressively increases in diameter toward the closed end of hole 14. The second tapered cross section surface portion 17 of the first annular depression 26, on the other hand, progressively decreases in diameter toward the closed end of hole 14. The smallest diameter of the tapered cross section of annular depression 26 is the same as the diameter of outermost annular surface portion. Tapered surfaces 18, 19, 20, 21 defining the second and third annular depressions 28, 30, in the inner wall of hole 14 are arranged in the same order as mentioned above, in such a manner that the tapered cross sections of these depressions 28, 30 are patterned like those of the aforementioned first annular depressions 26. Annular innermost surface portion 22 adjacent to tapered surface 21, having a flat cross section, has the same inner diameter as the aforesaid annular outermost surface portion 15. The junction between the tapered surfaces 17, 18, and also the junction between the tapered surfaces 19, 20, are chamfered to prevent the junctions from presenting a sharp edge. As seen in FIG. 1, tapered surfaces 16, 18, 20 face the closed end of hole 4, and tapered surfaces 17, 19, 21 face the open end of hole 4.

The outer diameter of a coupling pin 12 according to the present invention, progressively decreases from first annular depression 26, whose cross section is tapered toward outermost annular surface portion 15, and coupling pin 12 has a cylindrical section at the open end. In this case, length 11 of surface portion 16, length 12 of surface portion 18, and length 13 of surface portion 20 have a relationship $l1>l2>l3$. Angle $\alpha1$ of surface portion 16, angle $\alpha2$ of surface portion 18, and angle $\alpha3$ of surface portion 20 have a relationship $\alpha1<\alpha2<\alpha3$. As in the conventional sucker rod coupling pin, resin 30 is placed in coupling hole 4, and the stress exerted by the inserted sucker rod is sustained by the hardening of the surrounding resin.

Figure 2A:
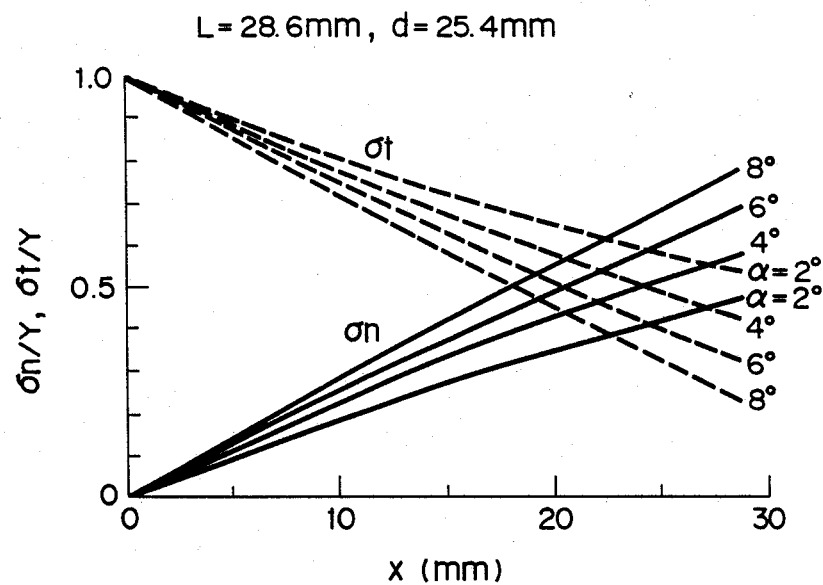
FIG. 2A indicates lengthwise and crosswise acting stresses applied to an annular depression which surrounds the inner wall of a coupling pin-receiving hole of the sucker rod, and whose cross section is tapered.
Figure 2B:
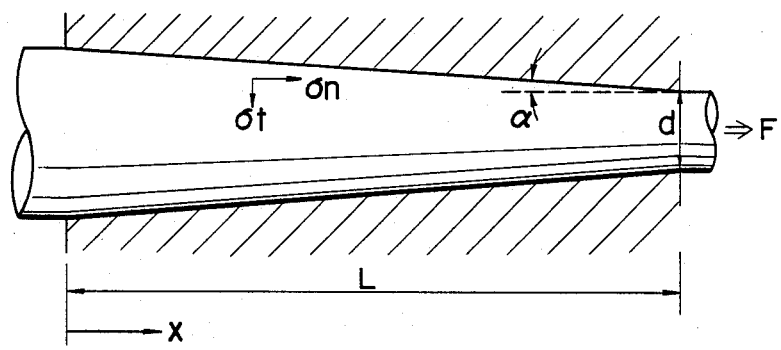
FIG. 2B shows the various points at which the magnitudes of the stresses given in FIG. 2A were determined.

The breaking of a fiber-reinforced plastics (abbreviated as "FRP") sucker rod occurs mainly when an axially acting stress is applied to a composite mass consisting of a FRP sucker rod and the surrounding resin. Referring to the tapered cross section of an annular depression shown in FIG. 2B, stress $\sigma n$ is applied to the tapered section in the axial direction, and stress $\sigma t$ is applied to the tapered section in the crosswise direction. The magnitude distribution of these two types of stress is indicated in the graph shown in FIG. 2A, in such a manner that it corresponds to an equivalent location of the tapered cross section shown in FIG. 2B. If taper angle $\alpha$ is reduced, a maximum axial stress $\sigma n$ will decrease, ensuring an increase in breakage strength. However, this results in a drawback in that sucker rod 10 tends to fall out of hole 4 of metal pin 2. Therefore, it is important to establish a proper balance between an axially acting stress and a diametrically acting stress.

The contact pressure of the coupling acting on the periphery of the sucker rod suddenly rises at that point at which the diameter of the metal pin is increased to a certain constant level. The contact pressure increases slightly toward the closed end of the sucker rod-receiving hole. Consequently, the prior art metal pin, wherein a plurality of tapered portions have the same angle and length, is accompanied with the drawback that the sucker rod breaks readily at the inlet to the second tapered portion, at which a stress applied from the surrounding region increases sharply.

Therefore, the sucker rod coupling pin according to the present invention is characterized that the angle of inclination increases toward the closed end of the sucker rod-receiving hole, thereby reducing the stress exerted by the metal pin against the periphery of the sucker rod, and decreasing the diametrically acting metal pin stress. Now let it be assumed that the tapered portions have the same length. Then, that tapered portion which has a greater taper angle undergoes a greater axial stress, and breakage will most likely take place at the tapered portion positioned near the closed end of the sucker rod-receiving hole. The present invention offers the advantage that since the length of the tapered portion decreases as the taper angle increases, the axial stress is more uniform in magnitude.

Figure 4:
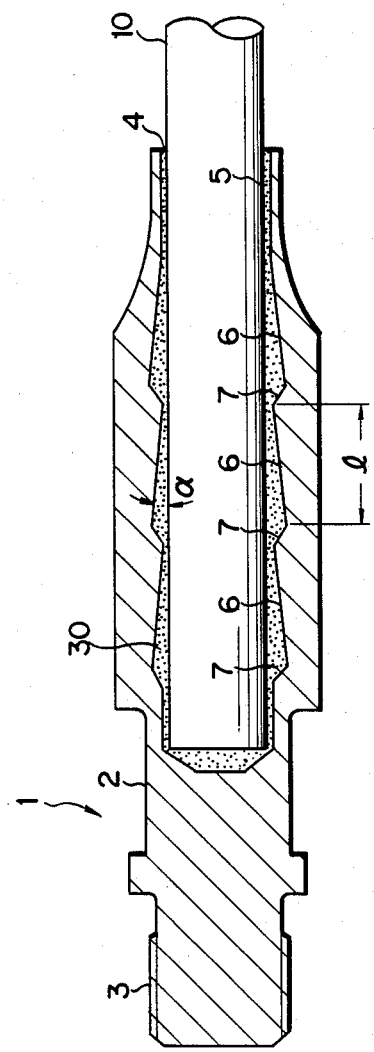
FIG. 4 illustrates the conventional metal coupling pin into which a sucker rod is inserted.

Tensile strength tests were carried out to ascertain the above-mentioned advantages of the present invention, in comparison with the prior art metal coupling pin. The sucker rod diameter measured 22 mm in both the conventional and the present coupling pin systems. In the prior art (FIG. 4), angle of inclination $\alpha$ measured about 4°, and taper length l measured 25.4 mm throughout the samples. In contrast, in a preferred embodiment of the sucker rod coupling pin of the present invention (FIG. 1), the angles of inclination $\alpha1$, $\alpha2$, and $\alpha3$ respectively measure 4°, 5°, and 6°, and the taper lengths l1, l2, and l3 respectively measure 30, 27, and 25 mm. l0, l4, and l5 respectively measure 20, 5, and 10 mm. FIG. 3 showing tensile load displacements shows that such a sucker rod coupling pin embodying the present invention has a tensile strength about 20% greater than the prior art device.

What is claimed is:

1. A coupling pin for use with a sucker rod, and which is made from fiber-reinforced plastics material, comprising:

an elongated hole in said coupling pin, one end of which is closed, and the other end of which is open for the insertion of a sucker rod in said elongated hole; and a plurality of annular depressions in the inner wall of said elongated hole, said annular depressions being arranged in a series from the open end to the closed end of said elongated hole, and, as viewed crosswise, said annular depressions each including a first tapered, substantially straight, surface portion having a given angle of inclination, the angle of inclination of said tapered portions of each of said annular depressions being such that the diameter of the respective annular depression increases toward said closed end of said elongated hole;

at least one of said first tapered surface portions being longer in length than a preceding first tapered surface portion, said preceding tapered surface portion being located more toward said closed end of said elongated hole than said at least one first tapered surface portion; and said first tapered surface portions progressively increasing in angle of inclination as their location varies from said open end to said closed end of said elongated hole.

2. The coupling pin according to claim 1, wherein:

there are provided first, second and third annular depressions in said inner wall of said elongated hole;

and, as viewed crosswise, said first, second and third annular depressions each have two tapered surface portions which comprise said first tapered surface portion and a second tapered surface portion, said first tapered surface portions of each annular depression facing said closed end of said elongated hole and said second tapered surface portions of each annular depression facing said open end of said elongated hole;

said second tapered surface portions facing said closed end of said elongated hole each having a larger angle of inclination than that of said first tapered surface portions facing said open end of said elongated hole; and said first, second, and third annular depressions are arranged in this order, as counted from said open end to said closed end of said elongated hole.

3. The coupling pin according to claim 2, wherein:
said first tapered surface portions of said first, second and third annular depressions, have respective lengths, in the axial direction of said elongated hole, which progressively decrease from said open end toward said closed end of said elongated hole, and which lengths respectively measure about 30, 27, and 25 mm; and
the angles of inclination of said first tapered surface portions of said first, second and third annular depressions measure approximately 4°, 5°, and 6°, respectively.

4. The coupling pin according to claim 3, wherein said elongated hole has a cylindrical portion between said open end and a first of said annular depressions.

5. The coupling pin according to claim 4, wherein said cylindrical portion has an inner diameter which is larger than the outer diameter of a sucker rod to be inserted therein.

6. The coupling pin according to claim 5, wherein said annular depressions are immediately adjacent each other such that a first tapered surface of one of said annular depressions meets a second tapered surface of the adjacent annular depression to define a junction therebetween.

7. The coupling pin according to claim 6, wherein said junction defines a surface portion having substantially the same inner diameter as said cylindrical portion of said elongated hole.

8. The coupling pin according to claim 6, wherein said junctions are chamfered.

9. The coupling pin according to claim 1, wherein said annular depressions are immediately adjacent each other such that a first tapered surface of one of said annular depressions meets a second tapered surface of the adjacent annular depression to define a junction therebetween.

10. The coupling pin according to claim 9, wherein said junctions are chamfered.

11. The coupling pin according to claim 5, wherein said elongated hole has a further cylindrical portion between said closed end and an adjacent annular depression, said further cylindrical portion having substantially the same inner diameter as said first-mentioned cylindrical portion.

12. The coupling pin according to claim 1, wherein said elongated hole has a cylindrical portion between said open end and a first of said annular depressions.

13. The coupling pin according to claim 12, wherein said elongated hole has a further cylindrical portion between said closed end and an adjacent annular depression.

14. The coupling pin according to claim 13, wherein said cylindrical portions have substantially the same inner diameter.

* * * * *